United States Patent
Lersch et al.

(10) Patent No.: US 6,582,526 B2
(45) Date of Patent: Jun. 24, 2003

(54) PROCESS AND APPARATUS FOR ACTIVE CLEANING OF WINDOWS OF A VEHICLE

(75) Inventors: Ferdinand Lersch, Munich (DE); Peter Holler, Landsberg (DE); Christian Haas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/765,399

(22) Filed: Jan. 22, 2001

(65) Prior Publication Data

US 2002/0005211 A1 Jan. 17, 2002

(30) Foreign Application Priority Data

Jan. 20, 2000 (DE) .......................................... 100 02 244

(51) Int. Cl.[7] .............................. A47L 1/00; B08B 1/02; B60S 1/02; B60S 1/04; B60S 1/46
(52) U.S. Cl. ......................... 134/6; 134/18; 15/250.02; 15/250.04; 239/284.1
(58) Field of Search .................... 134/6, 18; 15/250.01, 15/250.02, 250.04; 239/284.1

(56) References Cited

U.S. PATENT DOCUMENTS

| | | |
|---|---|---|
| 4,393,341 A | 7/1983 | Byrne |
| 4,922,570 A | 5/1990 | Hirohama et al. |
| 5,784,749 A * | 7/1998 | Garbacik et al. ......... 15/250.02 |
| 5,789,886 A * | 8/1998 | Ivice ........................ 15/250.02 |
| 5,819,360 A * | 10/1998 | Fujii ........................ 15/250.04 |

FOREIGN PATENT DOCUMENTS

| | | | |
|---|---|---|---|
| DE | 2216752 | 10/1973 | |
| DE | 2643549 | 3/1978 | |
| DE | 4117795 | * 12/1992 | .............. 15/250.04 |
| DE | 196 03 830 | 8/1997 | |
| DE | 196 05 927 | 8/1997 | |
| EP | 0764568 | 3/1997 | |
| GB | 2326083 | 12/1998 | |
| JP | 05286417 | 11/1993 | |
| JP | 405301564 A | * 11/1993 | .............. 15/250.04 |
| WO | WO 91/08933 | * 6/1991 | .............. 15/250.04 |

OTHER PUBLICATIONS

European Search Report.

* cited by examiner

*Primary Examiner*—Zeinab El-Arini
(74) *Attorney, Agent, or Firm*—Crowell & Moring LLP

(57) ABSTRACT

A process for active cleaning of a vehicle window with a movable window wiping arm carrying a wiping blade and with cleaning fluid supply onto the windowpane includes initiating movement of the wiping arm and subsequently applying a prescribed first quantity of cleaning fluid at a defined side of the wiping arm facing a first moving direction of the wiping arm. In an embodiment, a second prescribed quantity of cleaning fluid is applied that is smaller than the first quantity at the defined side during movement of the wiping arm in a second moving direction opposite the first moving direction.

17 Claims, 1 Drawing Sheet

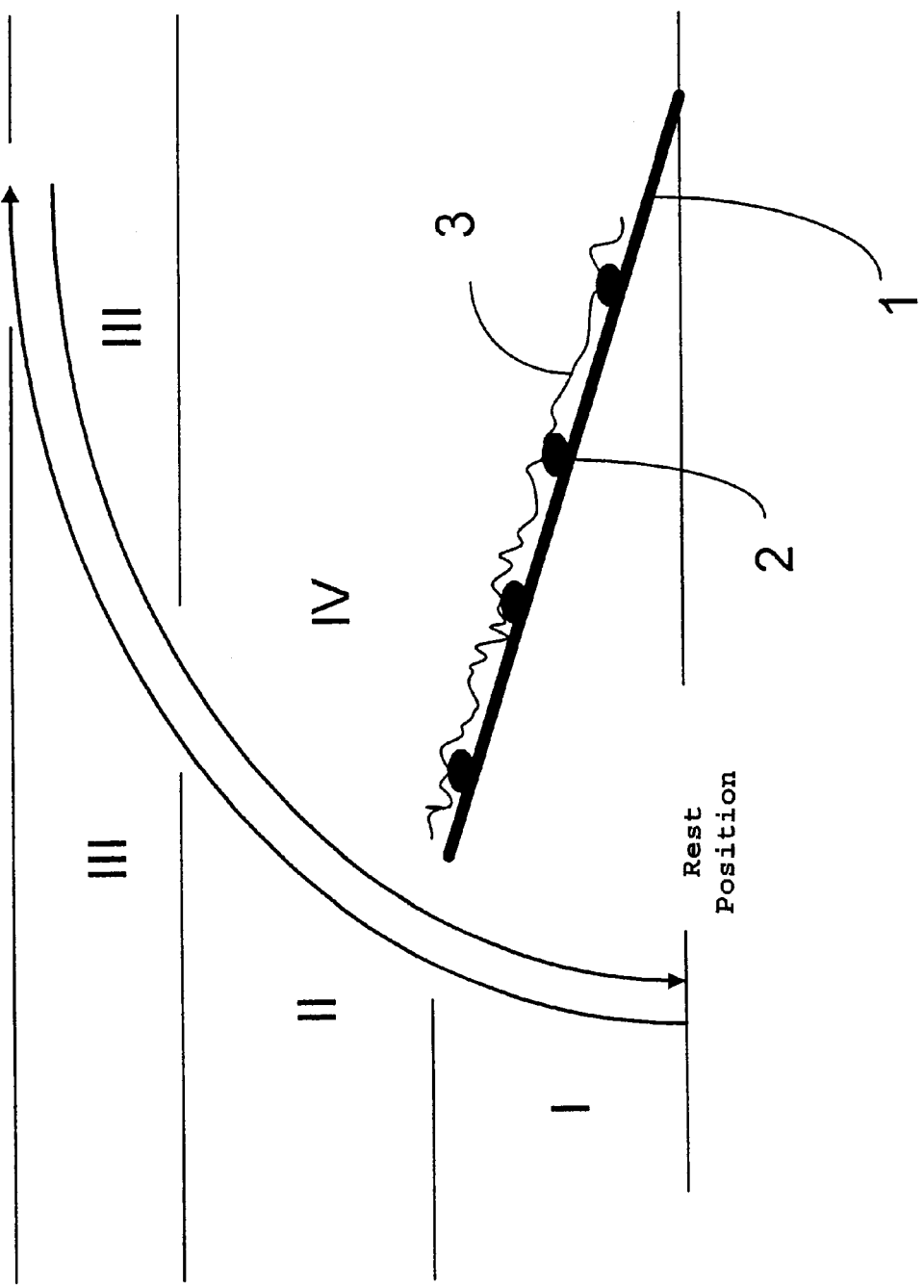

PROCESS AND APPARATUS FOR ACTIVE CLEANING OF WINDOWS OF A VEHICLE

BACKGROUND AND SUMMARY OF THE INVENTION

This application claims the priority of German Application No. 100 02 244.8, filed in Germany Mar. 18, 1999, the disclosure of which is expressly incorporated by reference herein.

The invention refers to a process for active cleaning of windows of a vehicle.

In German Patent publication DE 196 05 927 A1, for example, a process for active cleaning of windows in vehicles has been presented. In this known process a window wiper arm is used that includes a wiping blade and a tool to apply the cleaning fluid to the window. Hereby, the tools for application of the cleaning fluid in the form of jets are structured in such a way, that in relation to the longitudinal direction of the wiping blade, it can only be applied to one side of the wiping blade, the underside, when viewed in a resting position. In the process described in this publication the cleaning fluid is applied to the window in particular then, when the windshield wiper is moving in the opposite direction to the side on which the jets are, namely, when the window wiper arm is in the upward motion. This process, in connection with a prescribed cycle time of the window wiper arm makes it possible after an upward movement, that is after the first half of the wash cycle, to achieve an excellent cleaning result, however, preferably, it can only be used when the vehicle is standing, since visibility would be severely impacted.

In German Patent publication DE 196 03 830 A1 an arrangement for active cleaning of windows, in particular of windshields of vehicles, is described in which bilaterally in the longitudinal direction of the wiping blades, jets are indicated for application of the cleaning fluid. Here too, the cleaning effect is the primary focus without consideration of the influence on diminished visibility.

Therefore, it is a task of the invention to improve the process of the above mentioned type in such a way, that despite a guarantee of a good cleaning result, a reduction in visibility for the driver is avoided.

This problem is solved according to preferred embodiments of the invention by providing a process for active cleaning of window panes of a motor vehicle with a window wiper arm that comprises a wiping blade and mechanisms for application of cleaning fluid onto the window pane whereby the mechanisms for the application of the cleaning fluid are arranged and/or are controllable in such manner that, in relation to the longitudinal direction of the wiping blade the cleaning fluid is applied to a defined side of the wiping blade in the following steps:

waiting for activation of an active cleaning switch, and applying a prescribed first quantity of cleaning fluid after the start of the activation of the active cleaning switch, fundamentally only when the window wiping arm is moving in a direction of the defined side of the wiping blade.

The expression active cleaning refers in particular to a wiping with additional washing function through application of a cleaning fluid, like for example, pure water or water with cleaning substances. Most of the time, the additional washing function is activated by the driver by manual engagement of the active cleaning switch, e.g., in the form of a so-called washing pump switch. The active cleaning switch can, however, also be activated automatically through a control device that, for example, detects the degree of dirtiness of the window.

The tools to apply the cleaning fluid, e.g., the cleaning water jets can be placed relative to the longitudinal direction of the wiping blades or the wiping lip, either unilateral, that is, viewed at rest from above or below, or can be attached bilaterally. For bilateral placement of these tools it is in line with the invention to make one-sided control of these possible.

Activation of the active cleaning switch can either occur in a rest position or when the movement of the window wiper arm has already been started.

Important for preferred embodiments of the invention is the application of the cleaning fluid or a prescribed first significant amount of cleaning fluid, fundamentally only when the window wiper arm pushes this cleaning fluid in front of itself almost simultaneously with the application to the window. The invention prevents, that the cleaning fluid reduces visibility of larger areas of the window for longer periods of time. On the other hand, on account of the quick removal, a large quantity of cleaning fluid can be applied without reducing visibility.

The prescribed second quantity of the cleaning fluid which is smaller than the first quantity that is applied when the window wiper arm moves in the opposite direction in relation to the arrangement of the tools for application of the cleaning fluid, can also be zero. If the prescribed second quantity of the cleaning fluid is not zero, it is preferably chosen to be at most of such a quantity that adequate visibility is still guaranteed, the driver, however, can see the wetted window panes. With this, irritations are being prevented that could possibly exist for some drivers, because despite activation of the active cleaning switch no cleaning fluid is applied for half of a wash cycle.

The segmentation of the wiping angle area into a no-wash area and a wash area has the advantage that energy and cleaning fluid can be saved in the no-wash area. The no-wash area is defined simply by a briefly remaining angular path of the window wiper arm at the end of the wipe cycle half, so that an application of cleaning fluid in that area would not be efficient.

The wash area in turn is divided into a main wash area and a partially wetted area. At the beginning of the activation of the active cleaning switch in the partially wetted area, one starts with an angular path of the wiper that is too short to achieve a good cleaning result. Therefore, a second wash program is undertaken.

The second wash program is also executed when, on account of the length of the activation of the active cleaning switch at the command of the driver, it can be concluded that a longer washing function is intended.

The first and the second quantity of the cleaning fluid can be set by timing of the washing pump.

Other objects, advantages and novel features of the present invention will become apparent from the following detailed description of the invention when considered in conjunction with the accompanying drawings.

BRIEF DESCRIPTION OF THE DRAWINGS

The single drawing FIGURE schematically shows a window wiper arm with tools for the application of cleaning fluid as well as the various procedures and angular regions that were taken into consideration according to preferred embodiments of the invention.

DETAILED DESCRIPTION OF THE DRAWINGS

In the drawing, a window wiper arm 1 with tools 2 in the form of jets for the application of cleaning fluid 3 is presented. The jets 2 are placed on the—as seen at rest—upper side of the wiping blade. Following, this side will be referred to as the defined side, in short.

For that reason, in accordance with the invention, a prescribed first quantity is applied, preferably the maximum possible quantity through a washing pump of cleaning fluid 3 after starting the activation of an active cleaning switch, that is not shown here, fundamentally, it is applied only when the window wiper arm 1 moves in the direction of this defined side, in this instance, upward. During this, window wiper arm 1 or its wiping blade pushes a wave of water in front of it during the up movement shortly after application of the cleaning fluid 3 via jets 2 and the cleaning fluid 3.

In the presented execution area the prescribed second quantity of the cleaning fluid 3 is equal to zero, i.e., during the downward motion of the window wiper arm 1, no cleaning fluid 3 is applied to the window pane so that visibility is not diminished.

The cleaning fluid 3, in this case is applied only during the upward movement, depending on the wiping angle. Thereby, the entire wiping angle area is being divided into a no-wash area III and a wash area IV. The cleaning fluid 3 or the prescribed first quantity of the cleaning fluid 3 is applied only in wash area IV during the upward motion. The no-wash area III is specifically defined so that an application of the cleaning fluid is not necessary, since this area is not only outside of the center of vision of the driver, but can also be cleaned with the cleaning fluid that has been applied previously. Thus, electrical energy and also cleaning fluid can be saved.

The entire wash area IV in turn is divided into a main wash area I and a partially wetted area II. With the start of the activation of the active cleaning switch in the partially wetted area II within the wiping cycle half, in which the prescribed first quantity of the cleaning fluid 3 is fundamentally applied, here with the upward motion, there follows a second washing program, since in this case only the rest of the partially wetted area II, within the wash area IV, had cleaning fluid 3 applied to the windows. Hereby, it is proceeded from the fact that in certain situations, the short remaining angle path of the window wiper arm 1 in the partially wetted area II may not be sufficient for a satisfactory result. With the second wash program a complete additional wiping cycle with application of cleaning fluid 3 in wash area IV during the upward movement is added to the wiping cycle presently presented.

More emphatically, a second wash program is executed when the activating of the active cleaning switch happens in the no-wash area III during the upward movement, or is started during the upward movement. The quantity of the cleaning fluid 3 in the second cleaning program can be the same as the prescribed first quantity, or it can be a little less than that quantity. On the other hand, at the beginning of the activation of the active cleaning switch in the rest position, or in the subsequent main wash area I during the upward movement, no second cleaning program follows.

Fundamentally, at least one complete second cleaning program with application of cleaning fluid 3 can follow every activation of the active cleaning switch that lasts longer than the prescribed time from, for example 300 milliseconds after release of the active cleaning switch.

When fluctuating on-board voltage exists, the prescribed first and second quantity of the cleaning fluid 3 can be calibrated and largely maintained constant with correspondingly timed control of the washing pump.

Areas I, II and III comprise, preferably, approximately 30 degrees each of the rotational movement of the wiper blade over the window pane.

The jets 2 could also be attached below the wiping blade or in case of bilaterally placed jets, controlled under the wiping blade. In this case, the cleaning fluid 3 would be applied primarily during the downward motion. The areas I, II III or the areas III and IV would, in this case, be mirrored to the horizontal. The function with respect to the second wash program differentiates itself in particular in that, that no second wash program is necessary if the activation of the active cleaning switch starts during the upward motion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for active cleaning of window panes of a motor vehicle with a window wiper arm that comprises a wiping blade and mechanisms for application of cleaning fluid onto the window pane whereby the mechanisms for the application of the cleaning fluid are arranged in such manner that, in relation to a longitudinal direction of the wiping blade, the cleaning fluid is applied to a defined side of the wiping blade, said process comprising:

waiting for activation of an active cleaning switch;

applying a prescribed first quantity of cleaning fluid after a start of the activation of the active cleaning switch when the window wiper arm is moving in a direction of the defined side of the wiping blade; and applying a prescribed second quantity of cleaning fluid that is smaller than the first quantity, when the window wiper arm is moving in an opposite direction to the defined side.

2. Process according to claim 1, wherein the cleaning fluid is applied dependent on a wiping angle of the window wiper arm.

3. Process according to claim 2, wherein an entire wipe-angle area is divided at least into two angle areas including a first no-wash area and a second wash area; and wherein the prescribed first quantity of the cleaning fluid is applied only in the second wash area.

4. Process according to claim 3, wherein the second wash area is divided into at least two sub-areas including a main wash sub-area and second partially wetted sub-area; and wherein, at a start of the activation of the active cleaning switch in the second partially wetted sub-area in which fundamentally the prescribed first quantity of the cleaning fluid is applied, at least one complete additional wiping cycle with application of cleaning fluid in the at least two sub-areas follows in a second washing program.

5. Process according to claim 2, wherein, at an activation of the active cleaning switch for a longer time period than for a prescribed time frame after release of the active cleaning switch there follows at least one additional complete wiping cycle with application of cleaning fluid in a second washing program.

6. Process for active cleaning of window panes of a motor vehicle with a window wiper arm that comprises a wiping blade and mechanisms for application of cleaning fluid onto the window pane whereby the mechanisms for the application of the cleaning fluid are arranged in such manner that, in relation to a longitudinal direction of the wiping blade, the cleaning fluid is applied to a defined side of the wiping blade, said process comprising:

waiting for activation of an active cleaning switch; and applying a prescribed first quantity of cleaning fluid after a start of the activation of the active cleaning switch when the window wiper arm is moving in a direction of the defined side of the wiping blade;

wherein an entire wipe-angle area is divided at least into two angle areas including a first no-wash area and a second wash area; and wherein the prescribed first quantity of the cleaning fluid is applied only in the second wash area.

7. Process according to claim 6, wherein the second wash area is divided into at least two sub-areas including a main wash sub-area and second partially wetted sub-area; and wherein, at a start of the activation of the active cleaning switch in the second partially wetted sub-area in which fundamentally the prescribed first quantity of the cleaning fluid is applied, at least one complete additional wiping cycle with application of cleaning fluid in the at least two sub-areas follows in a second washing program.

8. Process according to claim 6, wherein the prescribed first quantity of the cleaning fluid is calibrated with timed control of a washing pump.

9. Process according to claim 6, wherein the prescribed first quantity of the cleaning fluid is set depending on an on-board control current voltage.

10. Process for active cleaning of window panes of a motor vehicle with a window wiper arm that comprises a wiping blade and mechanisms for application of cleaning fluid onto the window pane whereby the mechanisms for the application of the cleaning fluid are arranged in such manner that, in relation to a longitudinal direction of the wiping blade, the cleaning fluid is applied to a defined side of the wiping blade, said process comprising:

waiting for activation of an active cleaning switch; and applying a prescribed first quantity of cleaning fluid after a start of the activation of the active cleaning switch when the window wiper arm is moving in a direction of the defined side of the wiping blade;

wherein the cleaning fluid is applied dependent on an angle of the window wiper arm;

wherein an entire wipe-angle area is divided at least into two angle areas including a first no-wash area and a second wash area; and wherein the prescribed first quantity of the cleaning fluid is applied only in the second wash area.

11. Process according to claim 10, wherein the second wash area is divided into at least two sub-areas including a main wash sub-area and second partially wetted sub-area; and wherein, at a start of the activation of the active cleaning switch in the second partially wetted sub-area in which fundamentally the prescribed first quantity of the cleaning fluid is applied, at least one complete additional wiping cycle with application of cleaning fluid in the at least two sub-areas follows in a second washing program.

12. Process for active cleaning of window panes of a motor vehicle with a window wiper arm that comprises a wiping blade and mechanisms for application of cleaning fluid onto the window pane whereby the mechanisms for the application of the cleaning fluid are arranged in such manner that, in relation to a longitudinal direction of the wiping blade, the cleaning fluid is applied to a defined side of the wiping blade, said process comprising:

waiting for activation of an active cleaning switch; and applying a prescribed first quantity of cleaning fluid after a start of the activation of the active cleaning switch when the window wiper arm is moving in a direction of the defined side of the wiping blade;

wherein the cleaning fluid is applied dependent on an angle of the window wiper arm; and wherein, at an activation of the active cleaning switch for a longer time period than for a prescribed time frame after release of the active cleaning switch there follows at least one additional complete wiping cycle with application of cleaning fluid in a second washing program.

13. Process for active cleaning of a vehicle window with a movable window wiping arm carrying a wiping blade and with cleaning fluid supply onto a windowpane, said process comprising:

initiating movement of the wiping arm;

subsequently applying a prescribed first quantity of cleaning fluid at a defined side of the wiping arm facing a first moving direction of the wiping arm; and applying a second prescribed quantity of cleaning fluid that is smaller than said first quantity at said defined side during movement of the wiping arm in a second moving direction opposite the first moving direction.

14. Process according to claim 13, wherein an entire wipe-angle area is divided at least into two angle areas including a first no-wash area and a second wash area; and wherein the prescribed first quantity of the cleaning fluid is applied only in the second wash area.

15. Process according to claim 14, wherein the second wash area is divided into at least two sub-areas including a main wash sub-area and second partially wetted sub-area, and wherein, at a start of an activation of an active cleaning switch in the second partially wetted sub-area in which the prescribed first quantity of the cleaning fluid is applied, at least one complete additional wiping cycle with application of cleaning fluid in the at least two sub-areas follows in a second washing program.

16. Process according to claim 15, wherein, at an activation of the active cleaning switch for a longer time period than for a prescribed time frame after release of the active cleaning switch there follows at least one additional complete wiping cycle with application of cleaning fluid.

17. Process according to claim 14, wherein, at an activation of an active cleaning switch for a longer time period than for a prescribed time frame after release of the active cleaning switch there follows at least one additional complete wiping cycle with application of cleaning fluid in a second washing program.

* * * * *